United States Patent
Watanabe et al.

(10) Patent No.: US 7,111,046 B2
(45) Date of Patent: Sep. 19, 2006

(54) METHOD AND APPARATUS FOR PROCESSING PLURAL DIVIDED E-MAILS

(75) Inventors: Yuko Watanabe, Nara (JP); Madoka Tsutsumi, Tokyo (JP); Hidetoshi Yazaki, Yokosuka (JP); Takeshi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 587 days.

(21) Appl. No.: 10/182,841

(22) PCT Filed: Dec. 3, 2001

(86) PCT No.: PCT/JP01/10533

§ 371 (c)(1),
(2), (4) Date: Jul. 30, 2002

(87) PCT Pub. No.: WO02/47337

PCT Pub. Date: Jun. 13, 2002

(65) Prior Publication Data

US 2003/0018731 A1    Jan. 23, 2003

(51) Int. Cl.
 *G06F 7/14* (2006.01)
 *H04Q 7/20* (2006.01)

(52) U.S. Cl. .................. 709/206; 715/752; 455/517

(58) Field of Classification Search ............. 709/203, 709/206; 455/517; 715/752
See application file for complete search history.

(56) References Cited

U.S. PATENT DOCUMENTS

| | | | | |
|---|---|---|---|---|
| 5,754,778 A | * | 5/1998 | Shoujima | 709/206 |
| 5,850,219 A | * | 12/1998 | Kumomura | 715/751 |
| 6,219,150 B1 | * | 4/2001 | Eguchi | 358/1.15 |
| 6,311,210 B1 | * | 10/2001 | Foladare et al. | 709/206 |
| 6,351,467 B1 | * | 2/2002 | Dillon | 370/432 |
| 6,463,464 B1 | * | 10/2002 | Lazaridis et al. | 709/207 |
| 6,519,471 B1 | * | 2/2003 | Yamaguchi | 455/517 |
| 6,608,694 B1 | * | 8/2003 | Akimoto | 358/1.15 |
| 6,614,559 B1 | * | 9/2003 | Olin | 358/403 |
| 6,633,399 B1 | * | 10/2003 | Fukazawa | 358/1.15 |
| 6,701,346 B1 | * | 3/2004 | Klein | 709/206 |
| 6,775,689 B1 | * | 8/2004 | Raghunandan | 709/206 |
| 6,839,736 B1 | * | 1/2005 | Kajita et al. | 709/206 |
| 7,009,725 B1 | * | 3/2006 | Miyanaga | 358/1.15 |
| 7,035,902 B1 | * | 4/2006 | Bates et al. | 709/206 |

FOREIGN PATENT DOCUMENTS

| | | |
|---|---|---|
| JP | 8-329061 | 12/1996 |
| JP | 9-51353 | 2/1997 |
| JP | 11-355500 | 12/1999 |

(Continued)

OTHER PUBLICATIONS

"Focus on: Pitfall Hidden in Email Transfer", *Nikkei Communications*, Jul. 19, 1999, vol. 298, pp. Cover, 98-105 and 193. (translation included).

*Primary Examiner*—Dung C. Dinh
(74) *Attorney, Agent, or Firm*—Brinks Hofer Gilson and Lione

(57) ABSTRACT

In accordance with the registration contents of the divided mail table, the control unit determines whether to handle each mail section as one electronic mail or to handle all the interrelated mail sections as one compiled electronic mail and executes a processing in accordance with the determination, when the mail sections are deleted, returned or transferred, after the mail sections are received by a portable phone and stored in the mail memory.

19 Claims, 6 Drawing Sheets

FOREIGN PATENT DOCUMENTS

JP   2000-216807   8/2000

* cited by examiner

FIG. 4

| | MM |
|---|---|
| Date | NOVEMBER 13 at 9:50 |
| Mailnumber | M10101010 |
| n/m | 1/3 |
| To | xxx@aaa.co.jp |
| From | yyy@bbb.ne.jp |
| Title | ○○○ |
| Body | ……… |
| Date | NOVEMBER 13 at 9:50 |
| Mailnumber | M10101010 |
| n/m | 2/3 |
| To | xxx@aaa.co.jp |
| From | yyy@bbb.ne.jp |
| Title | ○○○ |
| Body | ……… |
| Date | NOVEMBER 13 at 9:50 |
| Mailnumber | M10101010 |
| n/m | 3/3 |
| To | xxx@aaa.co.jp |
| From | yyy@bbb.ne.jp |
| Title | ○○○ |
| Body | ……… |
| …… | |
| …… | |
| …… | |
| …… | |
| …… | |

METHOD AND APPARATUS FOR PROCESSING PLURAL DIVIDED E-MAILS

TECHNICAL FIELD

The present invention relates to a method and a device for transfer, deletion and reply for received plural mail sections of a divided electronic mail.

BACKGROUND ART

The number of characters in one electronic mail transmission is limited, due to handling limitations of a radio transmission or handling limitations of a portable phone display and so forth. Without any change, this causes great inconvenience to a portable phone user who cannot receive and transmit an electronic mail beyond a certain limitation, e.g., 250 characters.

Solutions to this problem are available. The technique of Japanese Patent Laid-Open Publication No. 9-51353 can be exemplified. According to this Japanese Patent Laid-Open Publication No. 9-51353, a mail server receives an electronic mail addressed to a certain portable phone as a first step and automatically divides the electronic mail into electronic mail sections with a certain length, if the character number exceeds handling limitations. The electronic mail section(s) divided in this way will be called "mail section(s)" hereinafter. Then the mail server puts a section number (i/m) on each section and transmits the mail sections to an addressee's portable phone. Here "m" is the total number of the mail sections and "i" is a certain section number assigned to each section of the mail sections. Upon receipt of these sections the addressee's portable phone sorts the mail sections by referring to the section number. Then the portable phone displays the mail sections one by one in numerical order in accordance with user's page turnover operation. Through this operation the mail sections are displayed as if they were a single non-divided electronic mail.

There are, however, different processing types other than the display processing by user's page turnover operation for mail sections received through a portable phone. For example, received mail sections can be deleted from portable phone's memory, returned to the sender, or transferred to another user's portable phones.

However, operations such as deletion, return and transfer of the above-mentioned mail sections are inconvenient for users. The problem originates from the difficulty of memorizing one electronic mail as plural mail sections.

DISCLOSURE OF INVENTION

In view of the above-mentioned problem, it is an object of the present invention to provide users with more convenient processing structures for deletion, return, transfer and so on in the matter of received plural sections.

In accordance with this object, the present invention provides an electronic mail system for electronic mail exchange between a first mail client capable of handling long electronic mails and a second mail client incapable of handling long electronic mails comprising a mail server for dividing a long electronic mail transmitted from said first mail client to said second mail client into plural mail sections in accordance with data volume of which said second mail client is capable and for transmitting said divided, plural electronic mail sections with an interrelation to said second mail client, and wherein, said second mail client comprises:

storage means for storing said transmitted plural mail sections with the interrelation;

determination means for determining whether to execute said processing on a single electronic mail section or to execute said processing on all of said plural mail sections stored with the interrelation in accordance with the instructed processing type, when a processing is instructed for said stored electronic mail sections; and execution means for executing said processing in accordance with the outcome of a determination carried out by said determination means.

The present invention provides users with very convenient environments, since it is determined in accordance with processing types whether to execute a processing on a single mail section or to execute a processing on all of interrelated plural mail sections.

In addition, the present invention provides a mail server between the first mail client capable of handling a long electronic mail and the second mail client incapable of handling said long electronic mail. When the mail server receives interrelated plural sections from the second mail client addressed to the first mail client, the mail server compiles the mail sections into one electronic mail and transmits the compiled electronic mail to the first mail client.

In addition, this invention provides a mail transmitter-receiver comprising:

storage means for storing plural mail sections with an interrelation, in the instance that a long electronic mail is transmitted after being divided into plural mail sections with said interrelation;

determination means for determining in accordance with an instructed processing type whether to execute said processing on a single mail section or to execute said processing on all of said plural mail sections, in the instance that an instruction is given to execute a processing on the mail sections stored in said storage means; and executing means for executing said processing in accordance with the outcome of a determination carried out by said determination means.

In addition, this invention provides a mail transmitter-receiver, wherein said determination means further comprises:

a deletion processing instruction to process collectively the interrelated plural mail sections;

a return processing instruction to process collectively said interrelated plural mail sections;

a transfer processing instruction for a terminal incapable of handling said long electronic mail to process separately said interrelated mail sections; and a transfer processing instruction for a terminal capable of handling said long electronic mail to process collectively said interrelated mail sections.

In addition, this invention provides a mail processing method comprising:

a step for storing plural mail sections with an interrelation, when interrelated plural mail sections are received;

a step for determining in accordance with an instructed processing type whether to execute said processing on a single mail section or to execute said processing on all of said interrelated plural mail sections, when said processing is instructed on said stored mail sections;

a step for executing said processing in accordance with the outcome of a determination carried out by the determination step.

In addition, this invention provides a mail processing method comprising:

a step for receiving interrelated plural mail sections transmitted from the second mail client incapable of handling a long electronic mail addressed to the first mail client capable of handling a long electronic mail;

a step for compiling said received plural mail sections into one electronic mail; and a step for transmitting said compiled electronic mail to said first mail client.

In addition, this invention provides a computer program product for causing a computer to execute:

a step for storing said plural mail sections with an interrelation, when interrelated plural mail sections are received;

a step for determining in accordance with an instructed processing type whether to execute a processing on a single mail section or to execute a processing on all of said interrelated plural mail sections; and a step for executing said processing in accordance with the outcome of a determination carried out by said determination step.

In addition, this invention provides a computer-readable storage medium storing a program for causing a computer to execute:

a step for storing plural mail sections with an interrelation, when interrelated plural mail sections are received;

a step for determining whether to execute a processing on a single mail section or to execute a processing on all of said interrelated plural mail sections in accordance with an instructed processing type; and a step for executing said processing in accordance with the outcome of a determination carried out by said determination step.

In addition, this invention provides a computer program product for causing a computer to execute:

a step for receiving interrelated plural mail sections transmitted from the second mail client incapable of handling a long electronic mail addressed to the first mail client capable of handling said long electronic mail;

a step for compiling said received mail sections into one electronic mail; and a step for transmitting said compiled electronic mail addressed to said first mail client.

In addition, this invention provides a computer-readable storage medium storing a program for causing a computer to execute:

a step for receiving interrelated plural mail sections from the second mail client incapable of handling a long electronic mail addressed to the first mail client capable of handling a long electronic mail;

a step for compiling said received plural mail sections into one electronic mail; and a step for transmitting said compiled electronic mail to said first mail client.

BRIEF DESCRIPTION OF DRAWING

FIG. 4 is a format diagram showing an example of memory contents of the embodiment in the mail storage unit of the portable phone.

BEST MODE FOR CARRYING OUT THE INVENTION

The preferred mode for utilizing the present invention will be described in detail by referring to drawings. However, a number of other embodiments are possible without departing from the inventive concept.

A: Configuration

First of all, the preferred mode configuration will be described.

(1) Configuration of Total System

Figure 1:
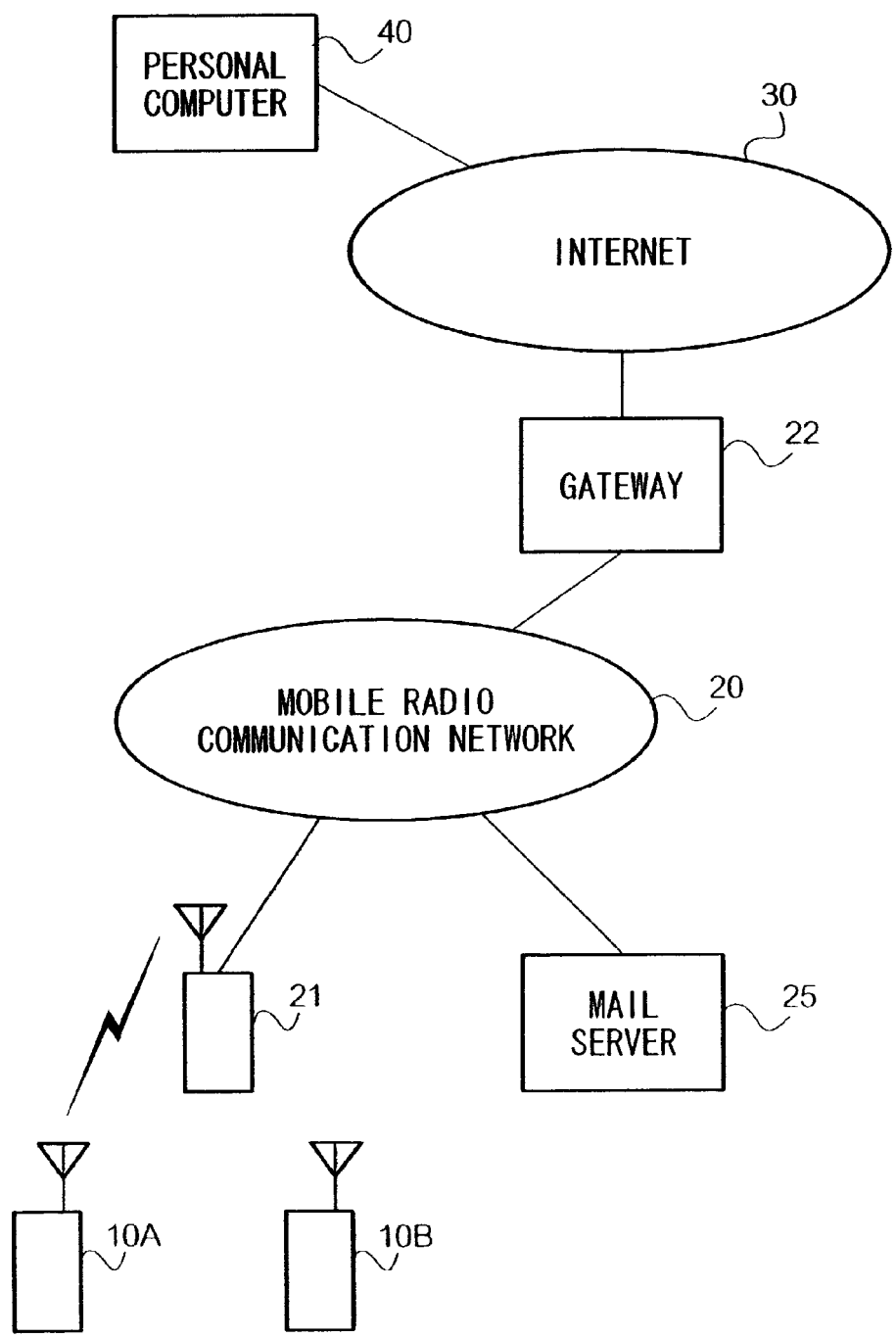
FIG. 1 is a block diagram showing a total system structure of the embodiment of this invention.

FIG. 1 is a block diagram showing a total system of this embodiment.

As shown in FIG. 1, this system mainly consists of portable phones 10A & 10B, mobile communication network 20, mail server 25, Internet 30 and personal computer (called PC, hereinafter) 40.

Portable phones 10A & 10B are radio communication devices such as terminals of cellular phone or PHS (Registered Trade Mark: Personal Handyphone System).

These portable phones 10A & 10B store allotted mail addresses for electronic mail exchange and function as mail clients for electronic mail exchange through mobile communication network 20. However, the number of characters in one electronic mail transmission is limited for these portable phones 10A & 10B. The maximum character number is here exemplified as 250 characters. An electronic mail transmission of more than 250 characters will hereinafter be described as a long electronic mail.

Portable phones 10A & 10B have the same structure. Therefore portable phones 10A & 10B will be described as portable phone 10 hereinafter, when it is not necessary to make a distinction between 10A and 10B.

PC 40 is connected to the Internet 30 and consists of a display unit (not shown in the drawings) for information display, an operation unit (not shown in the drawings) for a user operation, a communication unit (not shown in the drawings) for data communication through the Internet 30, and so on.

PC 40 stores allocated mail addresses and functions as a mail client through the Internet for electronic mail exchange. PC 40 can handle a long electronic mail, which portable phone 10 cannot handle.

Mobile communication network 20 is a network to provide data communication service and voice communication service to portable phone 10. This mobile communication network 20, connected to the Internet 30 through gateway 22, consists of base stations 21, a switching center (not shown in the drawings) and connecting communication cables.

A large number of base stations 21 are situated in a communication service area of mobile communication network 20 at regular intervals and these base stations communicate over radio with portable phones 10 located in each base station area, i.e., wireless cell. A switching station includes plural base stations and performs a switching function to cut off or connect communication lines with portable phones 10 located in the wireless cell. Gateway 22 has a data relay function between mobile communication network 20 and Internet 30.

Mail server 25 is connected with mobile communication network 20. Mail server 25 relays electronic mail exchange among mail clients between portable phone 10A and 10B, or between PC 40 and one of portable phones 10 A & 10 B.

Mail server 25 has a function to divide a long electronic mail into mail sections with 250 or fewer characters as well as a function to compile plural mail sections to recreate the original long electronic mail.

(2) Configuration of Mail Sever 25

Figure 2:
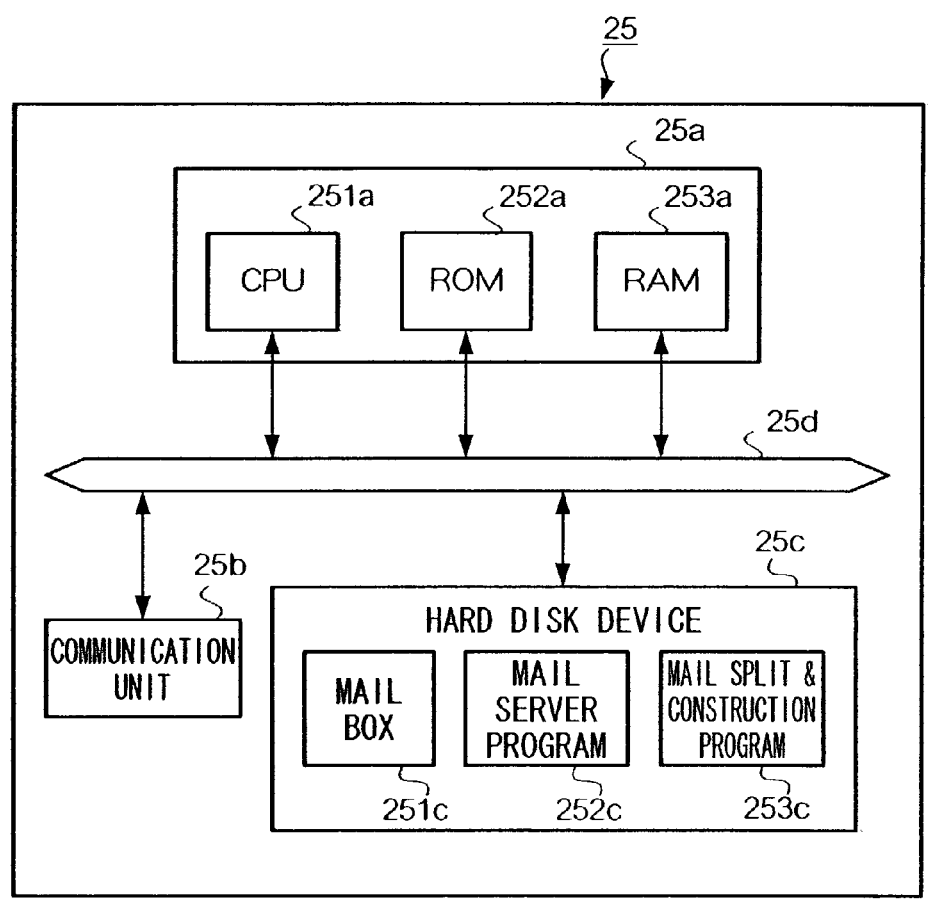
FIG. 2 is a block diagram showing a mail server structure of the embodiment.

The configuration of mail server 25 will be illustrated, referring to a block diagram of FIG. 2.

As shown in FIG. 2, mail server 25 consists of control unit 25*a*, communication unit 25*b*, hard disc unit 25*c* and interconnecting bus 25*d*.

Control unit 25*a* controls each unit of mail server 25 and consists of CPU (Central Processing Unit) 251*a*, ROM (Read Only Memory) 252*a* and RAM (Random Access Memory) 253*a*. ROM 252*a* stores various control programs and so on. CPU 251*a* executes a variety of control processing, reading out these control programs. Then RAM 253*a* is used as a working area of CPU 251*a*.

Communication unit 25*b* consists of a connection interface with Internet 30 and a communication control circuit, performing data communication through Internet 30.

Hard disc unit 25*c* has a memory area (called mail box 251*c* hereinafter) to store electronic mails addressed to portable phone 10.

Hard disc unit 25 also stores mail server program 252*c* as well as mail dividing & compiling program 253*c* for dividing long electronic mail addressed to portable phone 10 and for compiling mail sections transmitted from portable phone 10.

Control unit 25*a* transmits electronic mails stored in mail box 251*c* to portable phone 10 through mobile communication network 20. In the instance of a long electronic mail transmission, control unit 25*a* reads out the mail dividing & compiling program 253*c* from hard disc unit 25*c*, divides the body of the long electronic mail into mail sections with 250 or fewer characters, puts a necessary header on each mail section and transmits the mail sections one after another to portable phone 10.

On the other hand, when relaying interrelated mail sections from portable phone 10 to PC 40, control unit 25*a* reads out and executes the mail dividing & compiling program in hard disc unit 25*c*. Control unit 25*a* recreates the long electronic mail through this performing process, combining the bodies of each mail section after deleting unnecessary headers from plural mail sections. Control unit 25*a* transmits the recreated long electronic mail to PC 40 via mobile communication network 20 and Internet 30.

(3) Configuration of Portable Phone 10

Next, the configuration of portable phone 10 will be illustrated with an example of portable phone 10A.

Figure 3:
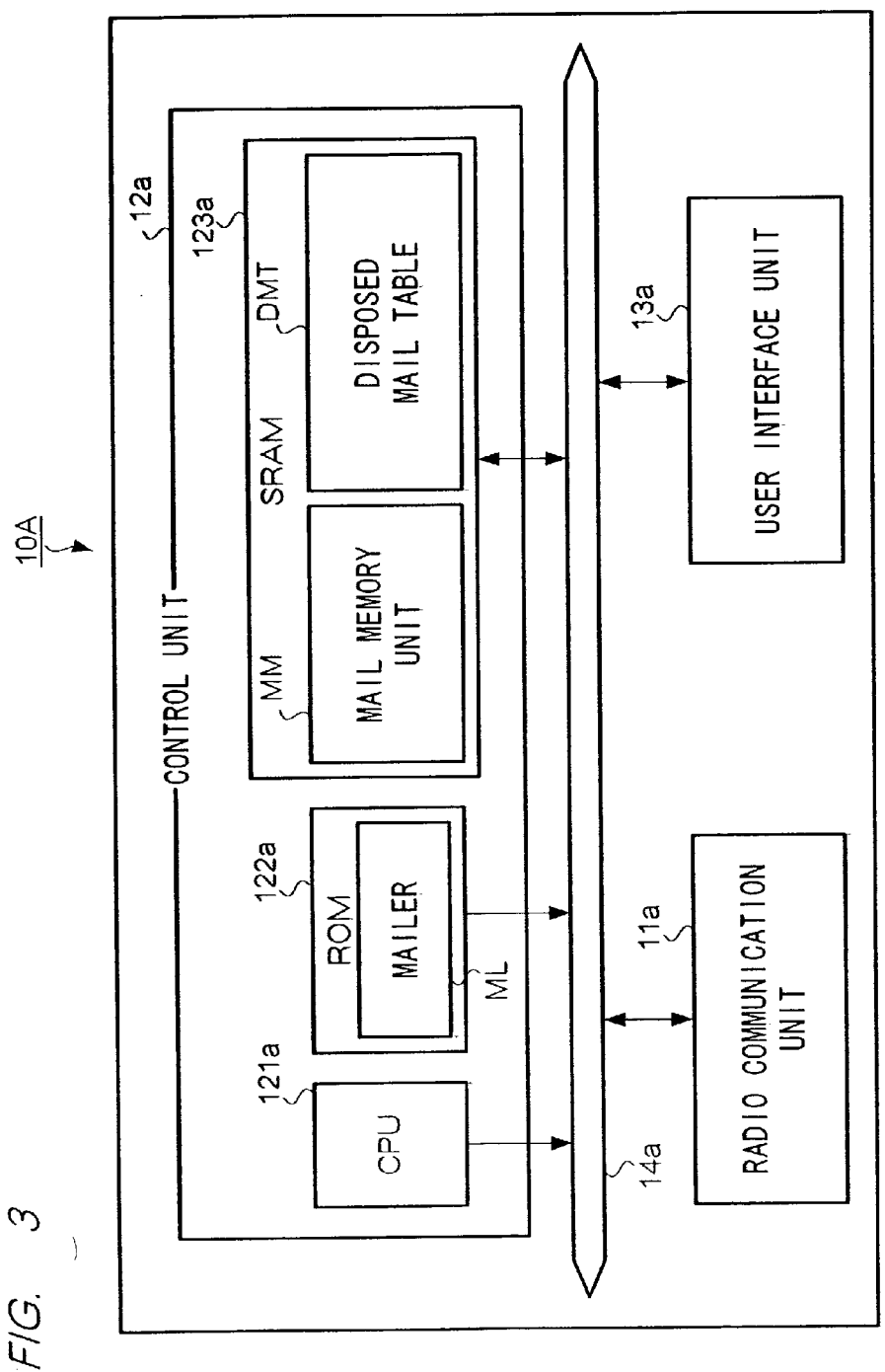
FIG. 3 is a block diagram showing a portable phone structure of the embodiment.

FIG. 3 shows a block diagram of the structure of portable phone 10A. Portable phone 10A consists of radio communication unit 11*a*, control unit 12*a*, user interface 13*a* and interconnecting bus 14*a*.

Radio communication unit 11*a*, consisting of an antenna and a communication control circuit (not shown in the drawings), communicates by radio with base station 21 of mobile communication network 20.

User interface unit 13*a* consists of a liquid crystal display capable of displaying information such as an electronic mail (drawing omitted), a keypad for typing, transmitting and receiving electronic mail messages (drawing omitted), and microphone & speaker for user's communication (drawing omitted).

Control unit 12*a* controls each unit of this portable phone and Control unit 12*a* consists of CPU 121*a*, ROM 122*a* and SRAM (Static Random Access Memory) 123*a*.

Rom 122*a* contains various control programs and CPU 121*a* executes the processing of various control functions in accordance with these control programs. These control programs include mailer ML for electronic mail generation, transmission & receipt, return, transfer, deletion in addition to portable phone 10A's well-known programs for communication functions.

SRAM 123*a* contains a memory area (called mail memory MM hereinafter) for storing received electronic mails together with Divided Mail Table DMT. Divided Mail Table DMT is a registered table of necessary information for mail section processing. When mail sections contained in mail memory MM are deleted, returned or transferred, control unit 12*a* determines in accordance with DMT registration whether to handle each mail section separately as a electronic mail or to compile all mail sections into one electronic mail.

(4) Configuration of Mail Memory MM

Next, the configuration of Mail Memory MM will be illustrated.

FIG. 4 is a format table showing an example of memory contents of Mail Memory MM. As shown in FIG. 4, Mail Memory MM stores with an interrelation "Date" for electronic mail receipt date and time, "Mail number" for mail ID number, "n/m" for mail section number, "To" for addressee, "From" for sender, "Title" for electronic mail title and "Body" for body data.

"Date" means date & time when an electronic mail from a sender mail client is received by mail server 25.

"Mail number" is granted in order to identify each electronic mail without confusion, when electronic mails from a sender mail client is received by mail server 25.

"M" of a mail section number "n/m" means the total number of the mail sections, while "n" means a section number from the first of the mail sections. For example, n/m "4/9" shows that a long electronic mail is divided into 9 mail sections and the mail section is the fourth mail section.

Detailed explanations are omitted concerning "To" for an electronic mail addressee, "From" for an electronic mail sender, "Title" for an electronic mail title and "Body" for body data, since they are widely known essential data for an electronic mail.

Portable phone 10 can grasp the existence or the non-existence of interrelated mail sections by referring to Date, Mail number and n/m stored in Mail Memory MM. FIG. 3 is to be referred. For example, n/m "1/3", n/m "2/3" and n/m "3/3" mean that an electronic mail is divided into 3 mail sections with Mail number "M10101010" and Date "November 13 at 9:50". Namely the mail sections with n/m "1/3", n/m "2/3", n/m "3/3" are interrelated. The mail sections are identified by Date "November 13 at 9:50" and Mail number "M10101010". These mail sections are called "interrelated plural mail sections".

(5) Configuration of Divided Mail Table DMT

Next, the configuration of Divided Mail Table DMT will be illustrated.

Figure 5:
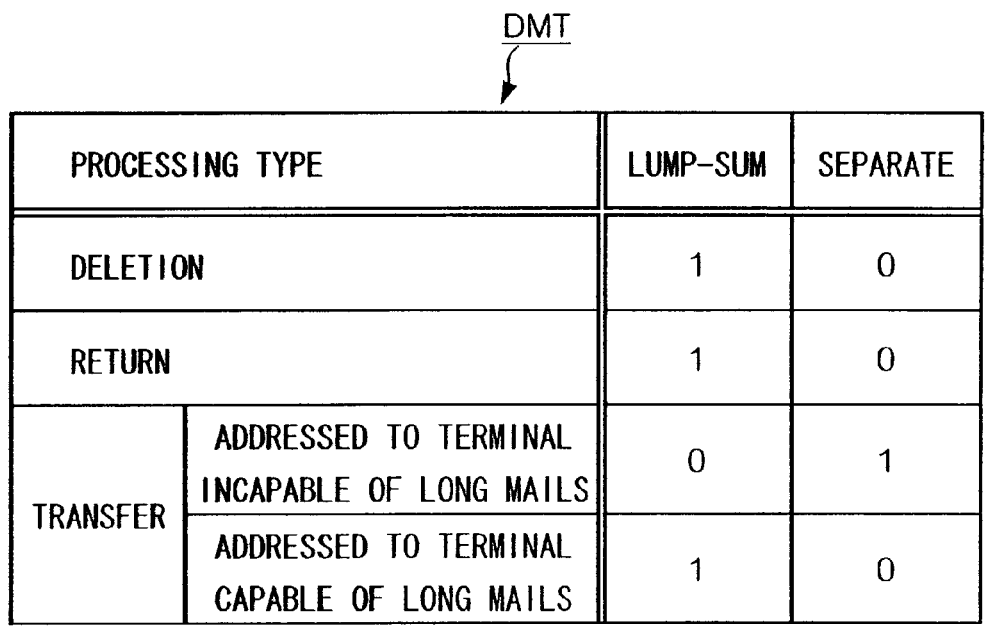
FIG. 5 is a format diagram showing an example of memory contents of the embodiment on Divided Mail Table DMT of the portable phone for mail section processing.

FIG. 5 is a format table showing an example of memory contents of Divided Mail Table DMT. Flag information is registered on Divided Mail Table DMT. The flag information shows whether to handle each mail section as one electronic mail or to handle all of interrelated plural mail sections as one electronic mail at the time of deletion, return or transfer.

As for transfer, different flag information is registered respectively for a mail client capable of handling a long electronic mail, or for a mail client incapable of handling a long electronic mail.

In FIG. 5, the flag is set up on the "collective" field for execution of a deletion command, meaning all interrelated sections will be processed as a compiled single electronic mail. Therefore, according to a user's deletion command, control unit 12 of portable phone 10 deletes collectively all the interrelated mail sections i.e., the mail sections with an identical date, time and mail number from Mail Memory MM.

For execution of a return command, because the flag is set up on the "collective" field, all the mail sections with the same date, time and mail number are returned collectively.

Regarding transfer, as mentioned above, the flag information can be set up according to whether the transferred mail client is able to handle long electronic mails. In FIG. 5, in the case of a transfer to a terminal incapable of handling long electronic mails, only a targeted single mail section is transferred, because the flag is set up in the "separate" field. However, in the case of a transfer to a terminal capable of handling long electronic mails, plural interrelated mail sections, i.e., all the mail sections with the same date, time and mail number are transferred, because the flag is set up in the "collective" field.

At the time of transfer, it is determined from the domain name of the transferred mail address whether the transferred mail client is able to handle long electronic mails. For example, in Japan the mail address of a portable phone incapable of handling long electronic mails is represented by xxx@aaa.co.jp, as shown in FIG. 4, so the domain name of the mail address is represented by "aaa.co.jp". Therefore, when portable phone 10 transfers mail sections to an electronic mail address which contains the domain name "aaa.co.jp", portable phone 10 refers to "addressed to the terminal incapable of handling long electronic mails" on Divided Mail Table DMT shown in FIG. 5. On the other hand, when portable phone 10 transfers mail sections to a mail address which contains a domain name other than "aaa.co.jp.", portable phone 10 refers to "addressed to the terminal capable of handling long electronic mails" on Divided Mail Table shown in FIG. 5 by the determination that the terminal is capable of handling long electronic mails.

The above-mentioned Divided Mail Table DMT is set up in a default mode at the time of shipment. However, users can rewrite the mode according to their requirements. Thus users can choose the processing types on mail sections for deletion, return and transfer by their preference.

B: Operation

Next, operations of the embodiment with the above structures will be explained.

Figure 6:
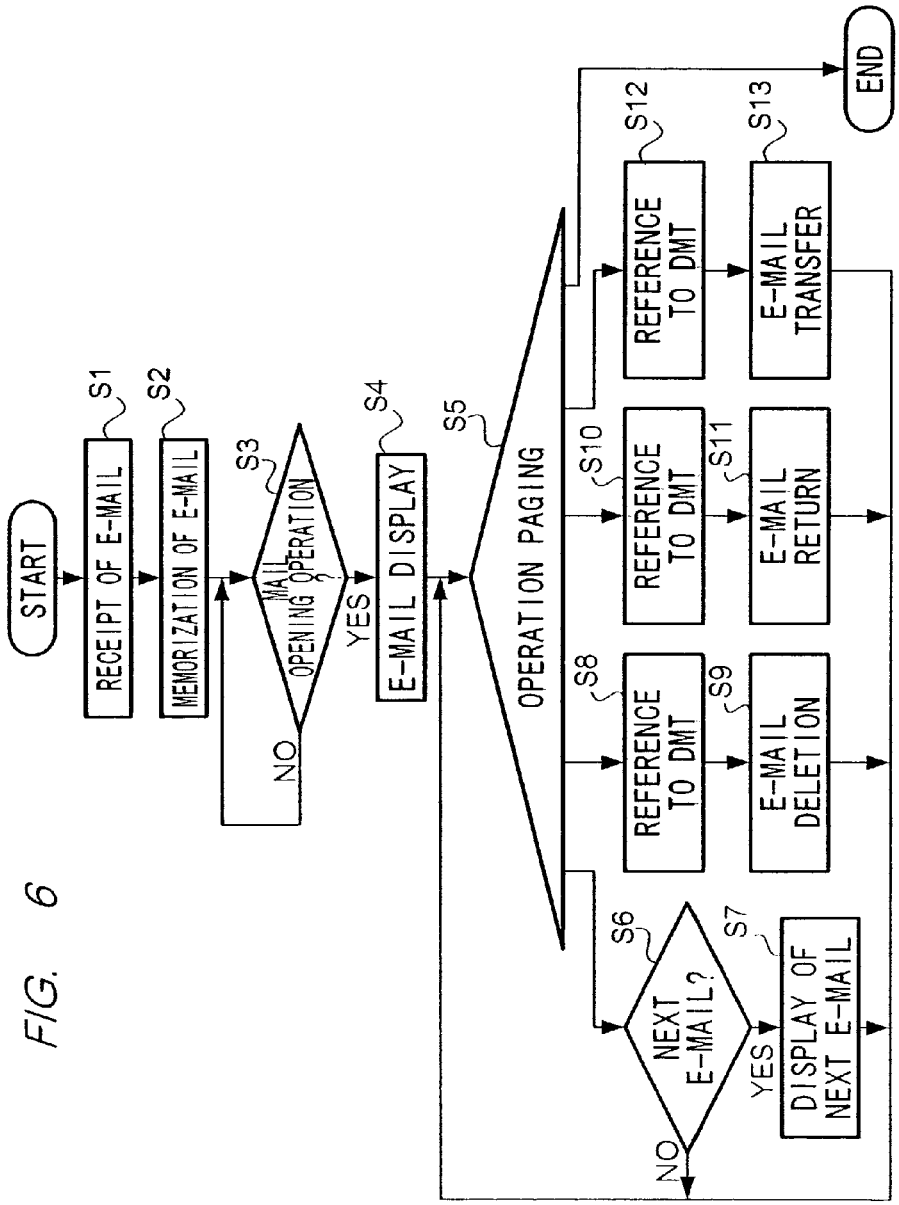
FIG. 6 is a flow chart showing an operating algorithm for a mailer operation through the portable phone of the embodiment.

The operations will be explained in the following order:
(1) Display of Mail Sections
(2) Deletion of Mail Sections
(3) Return of Mail Sections
(4) Transfer of Mail Sections (1) Display of Mail Section FIG. 6 shows a flow chart of an operation algorithm of mailer ML contained in ROM 122 implemented by CPU 121 in portable phone 10. An example will be provided through FIG. 6, showing a case that portable phone 10 A receives three mail sections corresponding to Date "November 13$^{th}$ at 9:50" and Mail number "M10101010" shown in FIG. 4.

Mail server 25 grants Date "November 13$^{th}$ at 9:50" and Mail number "M10101010" to a long mail received on November 13$^{th}$ at 9:50. After that mail server 25 divides the long mail into three mail sections and grants n/m "1/3", n/m "2/3", n/m "3/3" to each mail section. Then mail server 25 transmits three divided mail sections to portable phone 10 in the order of n/m "1/3", n/m "2/3", n/m "3/3".

On the other hand CPU 121 receives these mail sections from mail server 25 through mobile communication network 20 (Step S1) and stores the mail sections in Mail Memory MM (Step S2). Then CPU 121 determines that the received electronic mail is a mail section because the mail contains n/m "1/3". After CPU 121 receives all the mail sections with the same Date "November 13$^{th}$ at 9:50" and the same mail number "M10101010", CPU 121 sorts these mail sections in the numerical order of n/m "1/3", n/m "2/3", n/m "3/3". Then CPU 121 stores up these mail sections in Mail Memory MM.

Next CPU 121 displays a message of a receipt notice on the liquid crystal display, such as "A mail has been received. Will you open it? YES or NO?", waiting for user's opening operation (Step S3).

Responding to user's opening operation, CPU 121 reads out the data of the electronic mail section with the smallest number of n/m, i.e., n/m "1/3" from Mail Memory MM and displays the data of n/m "1/3" on the liquid crystal display (Step S4).

Next, CPU 121 accepts user's page turnover command (Step S5) and determines whether the next n/m exists (Step S6). An electronic mail with n/m "2/3" exists in this case (Step S6: YES). Therefore CPU 121 reads out the data of the mail section from Mail Memory MM and displays the data on the liquid crystal display (Step S7).

Hereafter CPU 121 accepts user's page turnover command and repeats the same process above mentioned. CPU 121 reads out and displays the data of the mail sections in numerical order from the smallest number of n/m. After CPU 121 displays the last mail section (Step S6: NO), CPU 121 returns to Step S5.

(2) Deletion of Mail Section

In the condition of displaying an electronic mail section of n/m "1/3" in Step S4, if the user inputs a "deletion" command, CPU 121 refers to Divided Mail Table DMT (Step S8) and deletes the mail section in accordance with the registered contents (Step S9).

In this case, the flag is set up on the "collective" field for the "deletion" on Divided Mail Table DMT shown in FIG. 5. Therefore CPU 121 determines that the mail sections should be collectively deleted. Then CPU 121 deletes all the mail sections, i.e., n/m "1/3", n/m "2/3", n/m "3/3" with Date "November 13$^{th}$ at 9:50" and Mail number "M10101010" from Mail Memory MM. Then CPU 121 returns to the process of Step S5.

Furthermore, if the flag is set up in the "separate" field on Divided Mail Table DMT for "deletion", a single mail section, i.e., only n/m "1/3" with Date "November 13$^{th}$ at 9:50" and Mail number "M10101010"is to be deleted from Mail Memory MM.

(3) Return of Mail Section

In the condition of displaying an electronic mail section of n/m "1/3" in Step S4, if the user inputs a "return" command, CPU 121 refers to Divided Mail Table DMT (Step S10) and returns the mail section in accordance with the registered contents (Step S11).

In this case, the flag is set up in the "collective" field on Divided Mail Table DMT for "return", as shown in FIG. 5. Therefore, CPU 121 determines that the mail sections should be returned collectively. Then CPU 121 reads out and returns the mail sections, i.e., not only displayed n/m "1/3" but also n/m "2/3" and n/m "3/3" with Date "November 13$^{th}$ at 9:50" and Mail number "M10101010" one after another to sender PC 40.

On the other hand, mail server 25 receives above returned mail sections one after another. Then mail server 25 compiles the bodies of the mail sections through "n/m", after mail server 25 deletes unnecessary headers of these mail sections. The mail server 25 returns the compiled electronic mail to the addressed personal computer 40.

It is general that users add optionally a return message to the displayed mail section. If the return message was added, the number of characters of the displayed mail section will surpass the maximum limitation of 250 characters by added characters of the return message. In this case CPU 121 deletes the last unit of the displayed body of the mail section as many as the return message characters to arrange the total characters to be 250 characters.

In an alternative way, users can delete an unnecessary unit of the mail section by his own operation. Afterwards users can inputs a return message up to the shortage caused by the deletion operation to be 250 total characters.

When the body of the mail section is rewritten as mentioned above, the stored mail section of n/m "1/3" in Mail Memory MM will not be returned, but the mail section with the rewritten body is to be returned.

Moreover, in case that the flag is set up in the "separate" field on Divided Mail Table DMT for "return", a single mail section, i.e., n/m "1/3" with Date "November 13$^{th}$ at 9:50" and Mail number "M10101010" is to be returned.

(4) Transfer of Mail Section

In the condition of displaying an electronic mail section of n/m "1/3" in Step S4, if the user inputs a "transfer" command addressed to another portable phone 10B, CPU 121 refers to Divided Mail Table DMT through the domain name of the transferred mail address (Step S12) and transfers the mail section in accordance with the registered contents (Step S13).

In the case of "transfer" "to a terminal incapable of handling long electronic mails", CPU 121 determines that mail sections should be transferred separately, since the flag is set up in the "separate" field on Divided Mail Table DMT shown in FIG. 5. Therefore CPU 121 transfers the mail section of n/m "1/3" with displayed Date "November 13$^{th}$ at 9:50" and Mail number "M10101010" to portable phone 10B. The transmitted mail section is relayed by mail server 25 and transferred to portable phone 10B.

At the time of the transfer operation, it is general that users optionally add a transfer message to the displayed mail section. Therefore the character number of the mail section will surpass the maximum of 250 characters as many as the character number of this transfer message.

In this case, in the same way as in the above return message, the last unit of the body of the mail section is deleted and the total message is arranged to be 250 characters by CPU 121. Or users can delete an unnecessary unit of the mail section by his own operation. Afterwards users can inputs a transfer message up to the shortage caused by the deletion operation to be 250 total characters.

The operation should be as follows for the transfer to a terminal capable of handling long electronic mails. In this case, CPU 121 determines that the mail sections should be transferred collectively, since the flag is set up in the "collective" field on Divided Mail Table DMT for the "transfer" "to a terminal capable of handling long electronic mails". And CPU 121 reads out the corresponding mail sections from Mail Memory MM and transfers the mail sections in succession to the terminal. Mail Server 25 receives the transmitted mail sections one after another. After mail server 25 deletes the unnecessary headers of the mail sections, mail server 25 compiles the mail sections into an electronic mail in accordance with n/m. Then mail server 25 transfers the compiled electronic mail to the terminal.

In the above-mentioned embodiment, flexible mail processing can be carried out, since it is possible to handle delete, return, and transfer functions in various ways on the basis of the registration of Divided Mail Table DMT.

In addition, users can rewrite the registration contents of the Divided Mail Table DMT. Therefore the processing can be carried out suitable to users' requirements.

The invention is not limited to the above-mentioned embodiment. Various modifications can be made within the scope of the technological spirit of the invention.

For example, it is registered on Divided Mail Table DMT how to delete, return and transfer mail sections in the above-mentioned embodiment. However, the invention is not limited to this way. Users can instruct every time to be collective or separate for deletion, return and transfer.

In addition, portable phone 10 is exemplified as a mail client incapable of handling long electronic mails and PC 40 as a mail client capable of handling long electronic mails in the embodiment. However, the invention is not limited to this way. Other types of mail clients are applicable.

In addition, the definition of a long electronic mail is not limited to an electronic mail exceeding 250 characters. The standard character number can be changed in various ways in accordance with the specifications for mail clients.

Furthermore, the invention can be carried out by distributing the programs, which are carried out in portable phone 10 or in mail server 25, through a network. In addition, the invention can be carried out by distributing the programs stored in a computer readable memory medium such as magnetic tape, magnetic disk, diskette, optical memory medium, optical magnetic memory medium, DVD (Digital Versatile Disk).

The invention claimed is:

1. A mail processing method comprising:
   storing plural mail sections as interrelated plural mail sections when the plural mail sections are received with an interrelation;
   determining, when instructing a transfer of the interrelated plural mail section to a mail client that is incapable of handling long electronic mails, to execute the transfer on a single mail section among the interrelated plural mail sections, and when instructing a transfer of the interrelated plural mail sections to a mail client that is capable of handling long electronic mails, to execute the transfer on all of the interrelated plural mail sections; and
   executing the instructed transfer following an outcome of a determination carried out in the determination step.

2. A computer-readable storage medium storing a program for causing a computer to execute:
   changing information in a processing table containing information for each one of types of processing indicating whether to execute a processing of the each one of types on a single mail section among interrelated plural mail sections or on all of the interrelated plural mail sections;

storing plural mail sections as interrelated plural mail sections when the plural mail sections are received with an interrelation;

determining, when a processing is instructed on the interrelated plural mail sections, whether to execute the processing on a single mail section among the interrelated plural mail sections or on all of the interrelated plural mail sections, based on information in the processing table for a type of the instructed processing contained; and executing the instructed processing following an outcome of a determination carried out in the determination step.

3. A computer-readable storage medium storing a program for causing a computer to execute:

storing plural mail sections as interrelated plural mail sections when the plural mail sections are received with an interrelation;

determining, when instructing a transfer of the interrelated plural mail sections to a mail client that is incapable of handling long electronic mails, to execute the transfer on a single mail section among the interrelated plural mail sections, and when instructing a transfer of the interrelated plural mail sections to a mail client that is capable of handling long electronic mails, to execute the transfer on all of the interrelated plural mail sections; and executing the instructed transfer following an outcome of a determination carried out in the determination step.

4. A mail transmitter-receiver comprising:

storage means for storing interrelated plural mail sections, when a long electronic mail is transmitted after being divided into plural mail sections with an interrelation, and for storing a processing table containing information for each one of types of processing indicating whether to execute a processing of the each one of types on a single mail section among the interrelated plural mail sections or on all of the interrelated plural mail sections;

table change means for changing information in the processing table in accordance with an operation carried out by a user of the mail transmitter-receiver;

determination means for determining, when a processing is instructed for the interrelated plural mail sections, whether to execute the processing on a single mail section among the interrelated plural mail sections or on all of the interrelated plural mail sections, based on information in the processing table for a type of the instructed processing contained; and execution means for executing the instructed processing following an outcome of a determination carried out by the determination means.

5. The mail transmitter-receiver according to claim 4, wherein the types of processing comprises at least one of deletion, return, and transfer of an electronic mail.

6. A mail transmitter-receiver comprising:

storage means for storing interrelated plural mail sections, when a long electronic mail is transmitted after being divided into plural mail sections with an interrelation;

determination means for determining, when a transfer for the interrelated plural mail sections is instructed to a third mail client incapable of handling long electronic mails, to execute the transfer on a single mail section among the interrelated plural mail sections, and when a transfer for the interrelated plural mail sections is instructed to a third mail client capable of handling long electronic mails, to execute the transfer on all of the interrelated plural mail sections; and execution means for executing the instructed processing of transfer following an outcome of a determination carried out by the determination means.

7. The mail transmitter-receiver according to claim 6, wherein the determination means determines whether the third mail client is incapable or capable of handling long electronic mails based on format of an address of the mail client.

8. The mail transmitter-receiver according to claim 6, wherein the storage means stores a processing table containing information for each one of types of processing indicating whether to execute a processing of the each one of types on a single mail section among the interrelated plural mail sections or on all of the interrelated plural mail sections, the mail transmitter-receiver further comprises table change means for changing information in the processing table in accordance with an operation carried out by a user of the mail transmitter-receiver; and the determination means performs the determination when information in the processing table indicates to execute a processing of transfer on all of the interrelated plural mail sections.

9. A mail processing method comprising:

changing information in a processing table containing information for each one of types of processing indicating whether to execute a processing of the each one of types on a single mail section among interrelated plural mail sections or on all of the interrelated plural mail sections;

storing plural mail sections as interrelated plural mail sections when the plural mail sections are received with an interrelation;

determining, when a processing is instructed on the interrelated plural mail sections, whether to execute the processing on a single mail section among the interrelated plural mail sections or on all of the interrelated plural mail sections, based on information in the processing table for a type of the instructed processing contained; and executing the instructed processing following an outcome of a determination carried out in the determination step.

10. The mail processing method according to claim 9, wherein the types of processing comprise at least one of deletion, return, and transfer of an electronic mail.

11. An electronic mail system for exchanging electronic mails among mail clients including a first mail client capable of handling long electronic mails and a second mail client incapable of handling long electronic mails, comprising:

a mail server for dividing a long electronic mail transmitted from the first mail client and addressed to the second mail client into plural mail sections in accordance with data volume of which the second mail client is capable of handling, and for transmitting the plural mail sections, as interrelated plural mail sections, to the second mail client, wherein the second mail client comprises:

storage means for storing the interrelated plural mail sections received from the mail server, and for storing a processing table containing information for each one of types of processing indicating whether to execute a processing of the each one of types on a single mail section among the interrelated plural mail sections or on all of the interrelated plural mail sections;

table change means for changing information in the processing table in accordance with an operation carried out by a user of the second mail client;

determination means for determining, when a processing is instructed for the interrelated plural mail sections, whether to execute the processing on a single mail section among the interrelated plural mail sections or on all of the interrelated plural mail sections, based on information in the processing table for a type of the instructed processing contained; and execution means for executing the instructed processing following an outcome of a determination carried out by the determination means.

12. The electronic mail system according to claim 11, wherein the types of processing comprise at least one of deletion, return, and transfer of the electronic mail.

13. The electronic mail system according to claim 11, wherein when the second mail client is instructed to return all of the interrelated plural mail sections, the execution means of the second mail client generates plural mail sections composing a return electronic mail addressed to the first mail client, and transmits the generated plural mail sections to the mail server, and when the mail server receives the plural mail sections of the return electronic mail from the second mail client, the mail server compiles the received plural mail sections into the return electronic mail, and transmits the compiled return electronic mail to the first mail client.

14. An electronic mail system for exchanging electronic mails among mail clients including a first mail client capable of handling long electronic mails and a second mail client incapable of handling long electronic mails, comprising:

a mail server for dividing a long electronic mail transmitted from the first mail client and addressed to the second mail client into plural mail sections in accordance with data volume of which the second mail client is capable of handling, and for transmitting the plural mail sections, as interrelated plural mail sections, to the second mail client, wherein the second mail client comprises:

storage means for storing the interrelated plural mail sections received from the mail server, determination means for determining, when a processing of transfer to a third mail client incapable of handling long electronic mails is instructed for the interrelated plural mail sections, to execute the processing of transfer on a single mail section among the interrelated plural mail sections, and when a processing of transfer to a third mail client capable of handling long electronic mails is instructed for the interrelated plural mail sections, to execute the processing of transfer on all of the interrelated plural mail sections; and execution means for executing the instructed processing of transfer following an outcome of a determination carried out by the determination means.

15. The electronic mail system according to claim 14, wherein the determination means of the second mail client determines whether the third mail client is incapable or capable of handling long electronic mails based on format of an address of the mail client.

16. The electronic mail system according to claim 14, wherein the storage means of the second mail client stores a processing table containing information for each one of types of processing indicating whether to execute a processing of the each one of types on a single mail section among the interrelated plural mail sections or on all of the interrelated plural mail sections, the second mail client further comprises table change means for changing information in the processing table in accordance with an operation carried out by a user of the second mail client; and the determination means of the second mail client performs the determination when information in the processing table indicates to execute a processing of transfer on all of the interrelated plural mail sections.

17. The electronic mail system according to any one of claims 11 and 14, wherein when the second mail client is instructed to transfer all of the interrelated plural mail sections to a third mail client capable of handling long electronic mails, the execution means of the second mail client addresses each of the interrelated plural mail sections to the third mail client and transmits each of the interrelated plural mail sections to the mail server, and when the mail server receives the interrelated plural mail sections from the second mail client, the mail server compiles the received plural mail sections into an electronic mail and transmits the compiled electronic mail to the third mail client.

18. The electronic mail system according to any one of claims 11 and 14, wherein the second mail client is a portable phone served by a mobile communication network.

19. The electronic mail system according to claim 18, wherein the first mail client is a computer connected to the Internet, which is connected to the mobile communication network.

* * * * *